United States Patent [19]

Kiko

[11] Patent Number: 5,303,106
[45] Date of Patent: Apr. 12, 1994

[54] ROTARY-HEAD DRUM DEVICE FOR GUIDING A TAPE THEREAROUND

[75] Inventor: Masahiro Kiko, Chiba, Japan

[73] Assignee: Sony Corporation, Japan

[21] Appl. No.: 51,440

[22] Filed: Apr. 22, 1993

Related U.S. Application Data

[63] Continuation of Ser. No. 715,621, Jun. 14, 1991, abandoned.

[30] Foreign Application Priority Data

Jul. 31, 1990 [JP] Japan .................................. 2-203466

[51] Int. Cl.⁵ .......................... G11B 5/53; G11B 21/18
[52] U.S. Cl. .................... 360/107; 360/130.24
[58] Field of Search ................ 360/107, 130.24, 130.3

[56] References Cited

U.S. PATENT DOCUMENTS 4,833,562 5/1989 Kochi et al. .................... 360/130.24
4,977,473 12/1990 Arai et al. ....................... 360/130.24

Primary Examiner—Robert S. Tupper
Attorney, Agent, or Firm—Ronald P. Kananen

[57] ABSTRACT

A rotary-head drum device for use in a video tape recorder or the like includes a fixed drum and a rotatable drum rotatably mounted on the fixed drum. Magnetic heads are mounted on the rotatable drum for sliding contact with a magnetic tape guided around the fixed drum and the rotatable drum. The fixed drum has an air outlet defined as a recess therein near a tape exit point where the magnetic tape leaves the fixed drum and the rotatable drum, for ejecting air against the magnetic tape to keep the magnetic tape in good contact with the magnetic heads near the tape exit point.

11 Claims, 3 Drawing Sheets

ROTARY-HEAD DRUM DEVICE FOR GUIDING A TAPE THEREAROUND

This application is a continuation of application Ser. No. 07/715,621 filed Jun. 14, 1991, now abandoned.

BACKGROUND OF THE INVENTION

1. Field of the Invention

The present invention relates to a rotary-head drum device for guiding a magnetic tape in a video tape recorder or the like.

2. Description of the Prior Art

FIG. 1 of the accompanying drawings shows a conventional rotary-head drum device for use in a video tape recorder or the like.

As shown in FIG. 1, a rotary-head drum device, generally denoted at 1, comprises a lower fixed drum 2 fixedly mounted on a base (not shown) and an upper rotatable drum 3 rotatably mounted on the lower fixed drum 2 for high-speed rotation thereon. Circumferentially spaced magnetic heads 4 are attached to the surface of the rotatable drum 3 which confronts the fixed drum 2, the magnetic heads 4 having tip ends projecting radially outwardly from the circumferential surface of the rotatable drum 3.

A lead step 5 is obliquely formed on the circumferential surface of the fixed drum 2. A magnetic tape T is wound around the circumferential surface of the rotary-head drum device 1 with one edge of the magnetic tape T extending along and held against the lead step 5. The magnetic tape T wound around the rotary-head drum device 1 is transported at predetermined speed.

When the rotatable drum 3 rotates at high speed at the same time the magnetic tape T is transported, the magnetic heads 4 slide against and obliquely scan the recording surface of the magnetic tape T for recording or reproducing signals.

The conventional rotary-head drum device 1 does not allow the magnetic heads 4 to contact the magnetic tape T well at an exit point for the magnetic tape T, i.e., a region where the magnetic tape leaves the circumference of the rotary-head drum device 1.

More specifically, while the rotatable drum 3 is rotating, the magnetic heads 4 scan the magnetic tape T while at the same time lifting the magnetic tape T. As shown in FIG. 2, an upper edge of the magnetic tape T is lifted slightly off the circumference of the rotatable drum 3 at the exit point by the magnetic heads 4. At the exit point, therefore, only an edge of the tip end of each of the magnetic heads 4 is held in contact with the recording surface of the magnetic tape T. Particularly, a magnetic tape in the form of a thin-film medium (so-called an ME-type magnetic tape) is not held in good contact with the tip end of the magnetic heads 4 because the magnetic tape is relatively rigid and less flexible, and hence suffers dropouts of recorded and reproduced signals.

Solutions would be to reduce the projection of the magnetic heads 4 from the circumferential surface of the rotatable drum 3 and to adjust or modify the path along which the magnetic tape T travels around the rotary-head drum 1. However, if the projection of the magnetic heads 4 becomes smaller, more dropouts are produced. If the tape path is adjusted or modified, the compatibility ratio is lowered.

OBJECTS AND SUMMARY OF THE INVENTION

In view of the aforesaid drawbacks of the conventional rotary-head drum device, it is an object of the present invention to provide a rotary-head drum device which has means for keeping a magnetic tape therearound in good contact with magnetic heads at a region where the magnetic tape leaves the rotary-head drum device.

According to the present invention, there is provided a rotary-head drum device comprising a fixed drum, a rotatable drum rotatably mounted on the fixed drum, and a magnetic head mounted on the rotatable drum for sliding contact with a magnetic tape guided around the fixed drum and the rotatable drum. The fixed drum has an air outlet defined therein near a tape exit point where the magnetic tape leaves the fixed drum and the rotatable drum.

While the rotatable drum is rotating, air is ejected out of the air outlet to force the magnetic tape radially outwardly to keep its upper edge in full contact with the entire outer surface of the tip end of the magnetic head. Therefore, the magnetic head and the magnetic tape are held in full contact with each other for reliable recording and reproducing of signals, without changing the projection of the magnetic head and the tape path along which the magnetic tape is wound around the rotatable and fixed drums.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

Figure 3:
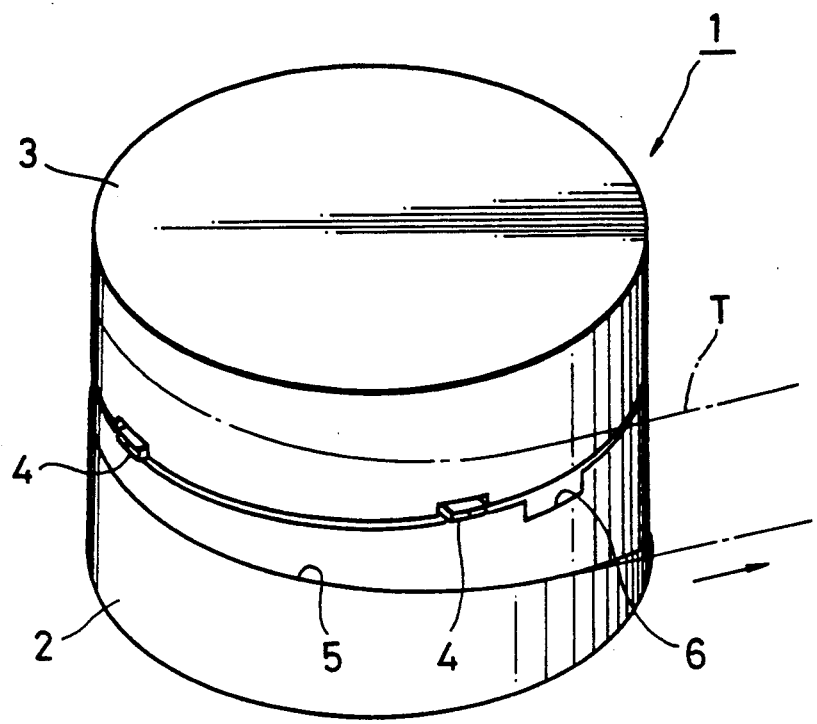
FIG. 3 is a perspective view of a rotary-head drum device according to the present invention.
Figure 4:
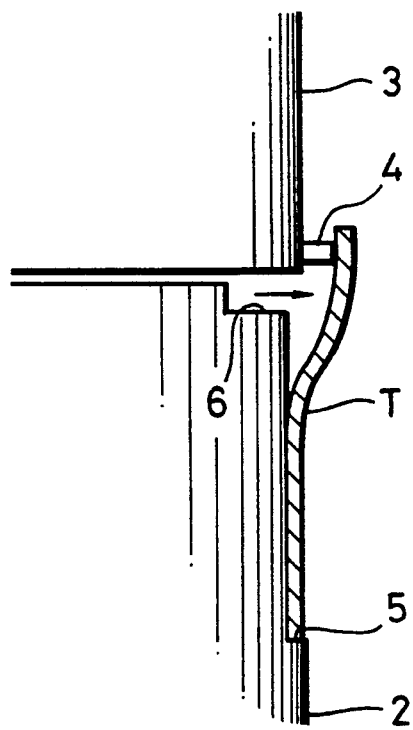
FIG. 4 is an enlarged fragmentary cross-sectional view of the rotary-head drum device shown in FIG. 3.
Figure 5:
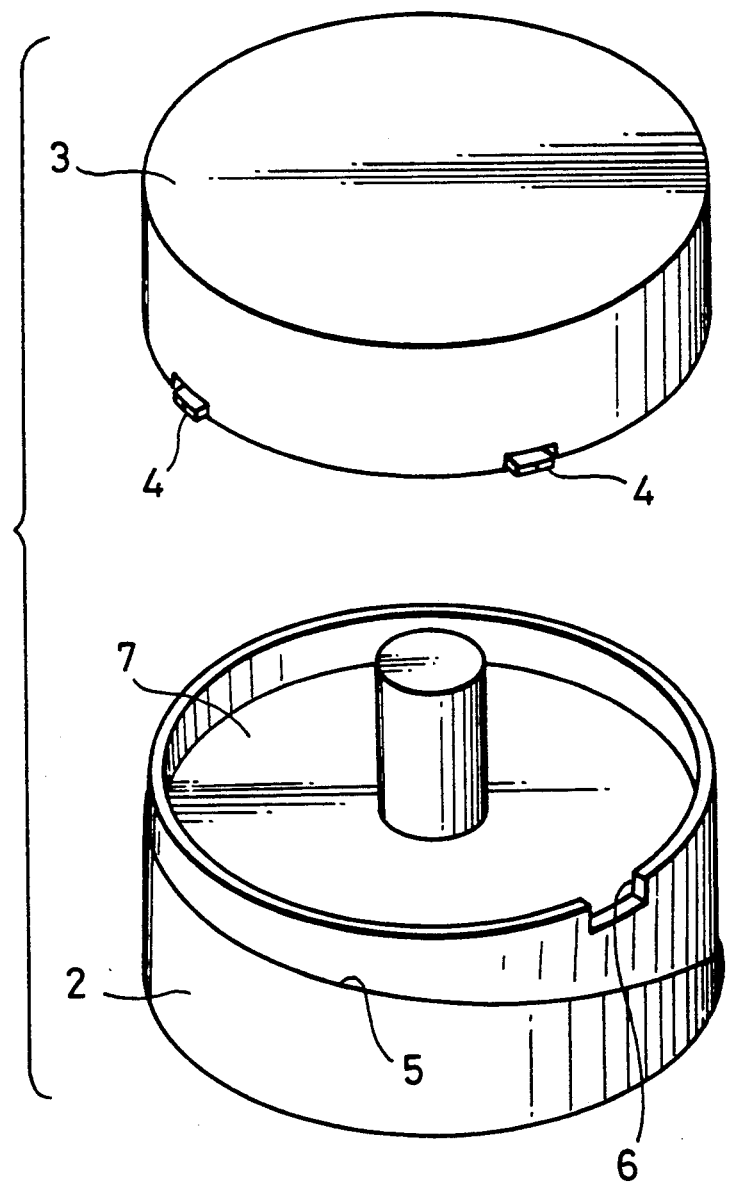
FIG. 5 is an exploded perspective view of the rotary-head drum device shown in FIG. 3.

A rotary-head drum device according to the present invention is shown in FIGS. 3 through 5. As shown in FIG. 3, the rotary-head drum device, generally indicated at 1, comprises a lower fixed drum 2 fixedly mounted on a base (not shown) and an upper rotatable drum 3 rotatably mounted on the lower fixed drum 2 for high-speed rotation thereon. The rotary-head drum 1 also has circumferentially spaced magnetic heads 4 attached to the surface of the rotatable drum 3 which confronts the fixed drum 2, the magnetic heads 4 having tip ends projecting radially outwardly from the circumferential surface of the rotatable drum 3.

A lead step 5 is obliquely formed on the circumferential surface of the fixed drum 2. A magnetic tape T is wound around the circumferential surface of the rotary-head drum device 1 with one edge of the magnetic tape T extending along and held against the lead step 5. The magnetic tape T wound around the rotary-head drum device 1 is transported at predetermined speed.

When the rotatable drum 3 rotates at high speed at the same time the magnetic tape T is transported, the magnetic heads 4 slide against and obliquely scan the recording surface of the magnetic tape T for recording or reproducing signals.

According to the present invention, the fixed drum 2 has an air outlet 6 defined in an upper edge of the outer circumferential surface thereof at a position near a tape exit point for the magnetic tape T, i.e., a region where the magnetic tape T leaves the rotary-head drum device 1. More specifically, the air outlet 6 circumferentially extends in an angularly range from 7° to 10° from the tape exit point toward a region where the magnetic tape T comes into contact with the outer circumference of the rotary-head drum device 1. The air outlet 6 is formed as a recess by cutting off the upper edge of the outer circumferential edge of the fixed drum 2 so that the air outlet 6 is positioned directly below the magnetic heads 4 when they are aligned with the air outlet 6 upon rotation of the rotatable drum 3. When the rotatable drum 3 rotates, air is ejected radially outwardly from the air outlet 6.

As illustrated in FIG. 5, the fixed drum 2 has a circular cavity or space 7 defined in its upper end which axially faces the rotatable drum 3, the cavity 7 communicating with the air outlet 6. When the rotatable drum 3 rotates at high speed, an air pressure buildup is developed in the cavity 7 by the magnetic heads 4 mounted on the rotatable drum 3. Therefore, air is ejected through the air outlet 7 under the air pressure buildup in the cavity 7. Though air slightly leaks out of the cavity 7 through the gap between the fixed drum 2 and the rotatable drum 3 at this time, air is ejected out of the air outlet 7 under a pressure much higher than the pressure of the air leakage.

Figure 1:
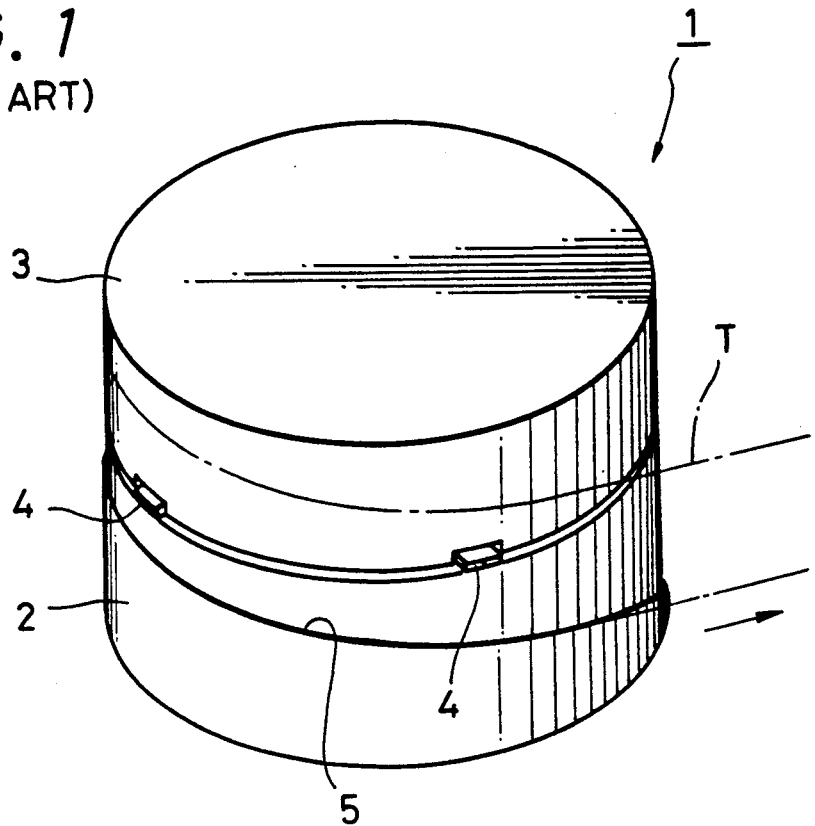
FIG. 1 is a perspective view of a conventional rotary-head drum device.
Figure 2:
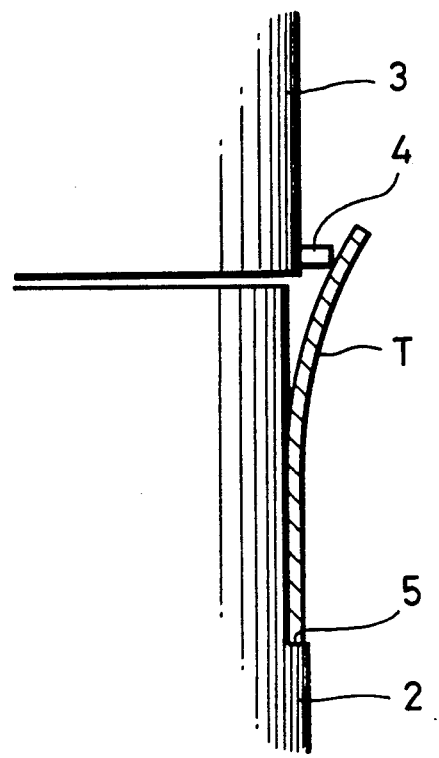
FIG. 2 is an enlarged fragmentary cross-sectional view of the rotary-head drum device shown in FIG. 1.

The air ejected under pressure from the air outlet 6 forces a portion of the magnetic tape T radially outwardly underneath its upper edge engaged by the magnetic heads 4, as shown in FIG. 2. Accordingly, the upper edge of the magnetic tape T is held in full contact with the entire outer surface of the outer tip end of the magnetic heads 4. As a result, the magnetic tape T is held in good contact with the magnetic heads 4 at the tape exit point. With the magnetic tape T kept in good contact with the magnetic heads 4, signals recorded on or reproduced from the magnetic tape T are not subject to dropouts, and therefore desired information can well be recorded on or reproduced from the magnetic tape T without error.

With the rotary-head drum device according to the present invention, the magnetic heads 4 are held in good contact with the magnetic tape T in the vicinity of the tape exit point for reliable recording and reproducing of information signals, simply by slightly machining the fixed drum 2 rather than varying the projection of the magnetic heads 4 or adjusting or modifying the tape path.

In the illustrated embodiment, the principles of the invention are applied to a rotary-head drum device with a lower fixed drum and an upper rotatable drum. However, the present invention is also applicable to a rotary-head drum device which includes a rotatable middle drum between upper and lower drums.

The lower surface of the rotatable drum 3 which axially confronts the fixed drum 2 may have a spiral radial groove for forcing air to be ejected from the air outlet 6 more reliably.

The air outlet 6 is not limited to a simple recess as shown, but may be a recess whose opening is progressively reduced toward the tape exit point to develop a partially varied air pressure for allowing the magnetic heads 4 to keep better contact with the magnetic tape T.

With the present invention, as described above, the air outlet provided near the tape exit point in the fixed drum permits the magnetic heads to be kept in good contact with the magnetic tape for reliably recording and reproducing desired signals, without changing the projection of the magnetic heads or the tape path.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

I claim as my invention:

1. A rotary-head drum device comprising:
   a fixed drum having a cylindrical wall and an interior cavity;
   a rotatable drum rotatably mounted on said fixed drum;
   a magnetic head mounted on said rotatable drum for sliding contact with a magnet tape guided around said fixed drum and said rotatable drum, wherein the fixed drum has a tape entry point where the magnetic tape makes contact with said cylindrical wall of the fixed drum and a tape exit point where the magnetic tape leaves contact with the cylindrical wall of the fixed drum, and wherein the magnetic tape is in contact with and guided around said cylindrical wall of said fixed drum between said tape entry and tape exit points; and
   said fixed drum having an air outlet defined through said cylindrical wall for allowing the passage of air under pressure from said interior cavity of said fixed drum, said air outlet being located adjacent to said tape exit point so that the passage of air under pressure through said air outlet will force a portion of the magnetic tape adjacent to the magnetic head radially outwardly to increase contact area of the magnetic tape with the magnetic head.

2. A rotary-head drum device according to claim 1, wherein said air outlet is formed as a recess through said cylindrical wall in an edge of said fixed drum.

3. A rotary-head drum device according to claim 1, wherein said interior cavity of the fixed drum is defined in an interior end thereof which confronts said rotatable drum, said cavity communicating with said air outlet and allowing passage of said air under pressure.

4. A rotary-head drum device according to claim 1, wherein said air outlet extends circumferentially along said fixed drum seven to ten degrees from said tape exit point in a direction upstream from the direction of tape travel.

5. A rotary-head drum device according to claim 3, wherein when said rotatable drum rotates at high speed air pressure buildup develops in said cavity and is ejected through said air outlet.

6. A rotary-head drum device according to claim 5, wherein said air pressure buildup which is developed when said rotatable drum is rotated at high speed is developed, at least in part, by said magnetic heads mounted on said rotatable drum.

7. A rotary head drum device comprising:

a fixed drum having a cylindrical wall surface, a closed bottom surface and an open top surface forming a cavity therein;

a rotatable drum rotatably mounted on said fixed drum and bounding said cavity, wherein said rotatable drum rotates at high speeds causing an air pressure buildup in said cavity;

at least one magnetic head mounted on said rotatable drum for sliding contact with a magnetic tape guided around said fixed drum and said rotatable drum between a tape entry and a tape exit point, the magnetic tape coming into contact with said fixed drum and said rotatable drum at said tape entry point and the magnetic tape leaving contact with said fixed drum and said rotatable drum at said tape exit point; and said fixed drum having a recessed portion cut out of said cylindrical wall surface adjacent said open top surface creating an opening through said cylindrical wall surface in communication with said cavity, said opening located adjacent to said tape exit point so that the air buildup in said cavity will exit under pressure through said opening and force a portion of the magnetic tape adjacent to said magnetic head radially outwardly to increase contact area of the magnetic tape with the magnetic head.

8. A rotary head drum device according to claim 7, wherein said recessed portion extends circumferentially along said fixed drum seven to ten degrees from said tape exit point in a direction upstream from the direction of tape travel.

9. A rotary head drum device according to claim 7, wherein said air pressure buildup which is developed when said rotatable drum is rotated at high speed is developed, at least in part, by said at least one magnetic head.

10. A rotary head drum according to claim 7, wherein the opening of said recessed portion is progressively reduced toward the tape exit point to vary the pressure of the air exiting the opening.

11. A rotary head drum device comprising:

a fixed drum having a cylindrical wall surface, a closed bottom surface and an open top surface forming a cavity therein, said cylindrical wall surface having an upper edge;

a rotatable drum rotatable mounted on said fixed drum over said open top surface and bounding said cavity, said rotatable drum having a lower edge facing said upper edge of said fixed drum at a first distance therefrom, wherein said rotatable drum rotates at high speeds causing an air pressure buildup in said cavity;

at least one magnetic head mounted on said rotatable drum for sliding contact with a magnetic tape guided around said fixed drum and said rotatable drum between a tape entry and a tape exit point, the magnetic tape coming into contact with said fixed drum and said rotatable drum at said tape entry point and the magnetic tape leaving contact with said fixed drum and said rotatable drum at said tape exit point; and said upper edge of the fixed drum having a recessed portion cut out of said cylindrical wall surface creating an opening extending through said cylindrical wall surface in communication with said cavity, said opening having an upper edge portion facing said lower edge of said rotatable drum at a second distance therefrom, said second distance being substantially greater than said first distance, said opening located adjacent to said tape exit point so that the air buildup in said cavity will exit under pressure through said opening and force a portion of the magnetic tape adjacent to said magnetic head radially outwardly to increase contact area of the magnetic tape with the magnetic head.

* * * * *